United States Patent
Suzuki et al.

(10) Patent No.: US 9,109,785 B2
(45) Date of Patent: Aug. 18, 2015

(54) SNOW-MELTING LED TRAFFIC SIGNAL

(71) Applicants: HARD GIKEN KOGYO CO., LTD., Iida-shi, Nagano (JP); Shinichi Nakamura, Arakawa-ku, Tokyo (JP)

(72) Inventors: Toshihiro Suzuki, Iida (JP); Michiaki Imao, Gifu (JP)

(73) Assignees: HARD GIKEN KOGYO CO., LTD., Iida-shi, Nagano (JP); Shinichi Nakamura, Tokyo (JP)

( * ) Notice: Subject to any disclaimer, the term of this patent is extended or adjusted under 35 U.S.C. 154(b) by 9 days.

(21) Appl. No.: 14/085,044

(22) Filed: Nov. 20, 2013

(65) Prior Publication Data

US 2014/0152471 A1    Jun. 5, 2014

(30) Foreign Application Priority Data

Dec. 4, 2012 (JP) .................................. 2012265025

(51) Int. Cl.

| H05B 1/02 | (2006.01) |
| F21V 29/00 | (2015.01) |
| F21V 29/90 | (2015.01) |
| F21V 5/04 | (2006.01) |
| F21W 111/02 | (2006.01) |
| F21Y 101/02 | (2006.01) |
| F21Y 105/00 | (2006.01) |
| F21V 29/83 | (2015.01) |

(52) U.S. Cl.
CPC ............... *F21V 29/008* (2013.01); *F21V 29/90* (2015.01); *F21V 5/045* (2013.01); *F21V 29/83* (2015.01); *F21W 2111/02* (2013.01); *F21Y 2101/02* (2013.01); *F21Y 2105/001* (2013.01); *H05B 1/02* (2013.01)

(58) Field of Classification Search
CPC ........... H05B 1/02; F21V 21/00; F21V 29/00; F21V 29/008; F21V 5/045; F21V 13/04
USPC .................................. 340/907, 916, 924, 928
See application file for complete search history.

(56) References Cited

U.S. PATENT DOCUMENTS

| 6,601,983 B1* | 8/2003 | Runfola et al. ............... 362/545 |
| 7,211,771 B1* | 5/2007 | Smith et al. .................. 219/502 |
| 2010/0149785 A1* | 6/2010 | Dubuc et al. .................... 362/92 |
| 2012/0255942 A1* | 10/2012 | Vodvarka ...................... 219/209 |
| 2013/0107540 A1* | 5/2013 | Wu et al. ....................... 362/309 |

FOREIGN PATENT DOCUMENTS

| JP | 3072584 U | 10/2000 |
| JP | 3163928 U | 11/2010 |

* cited by examiner

*Primary Examiner* — Brent Swarthout
(74) *Attorney, Agent, or Firm* — Holtz, Holtz, Goodman & Chick PC (57) ABSTRACT

Provided is an LED traffic signal which can inhibit snow accretion, ice accretion, frost accretion, freeze of snow, freeze of ice, freeze of frost, and the like promptly without fail and which can obtain satisfactory visibility. The snow-melting LED signal includes: an LED signal light including in order: a lens cover; a heat generating sheet; an LED mask plate; an LED lens module; and a printed board protection cover; and a signal body for housing the LED signal light.

13 Claims, 5 Drawing Sheets

SNOW-MELTING LED TRAFFIC SIGNAL

BACKGROUND OF THE INVENTION

1. Field of the Invention

The present invention relates to a snow-melting light-emitting diode (LED) traffic signal, which can inhibit snow accretion, ice accretion, frost accretion, freeze of snow, freeze of ice, freeze of frost, and the like promptly without fail, and can obtain satisfactory visibility.

2. Description of the Related Art

A traffic signal is a device which is indispensable for ensuring safety of road traffic and smoothness of a traffic flow.

In recent years, installation of, as such traffic signals, LED traffic signals has already been carried out in the respective prefectures here in Japan as a national policy making use of characteristics of LEDs such as low power consumption and long life. At present, ⅓ to ¼ of incandescent signals installed in Japan have been replaced by LED signals.

In Japan, which being long in a north-south direction, except for southern parts thereof and the like, snow, ice, or frost accretes to traffic signals in winter or the like to lower the visibility of the traffic signals, which is an obstacle to safe road traffic.

Still, in a conventional incandescent (60 W) traffic signal, the incandescent lamp itself generates heat, and thus, the problem of snow accretion, ice accretion, and the like has not been so serious compared to the present situation owing to the generated heat.

However, an LED traffic signal is more excellent in energy efficiency with lower power consumption, but generates less heat compared to those of a conventional traffic signal, which adversely affect the situation to thereby arise a problem frequently such that snow or ice accretes to traffic signals in winter or the like and a signal light is hardly visible, whereby leading to a serious accident.

Therefore, measures to prevent snow accretion, ice accretion, frost accretion, freeze of snow, freeze of ice, and freeze of frost are strongly desired especially with regard to LED traffic signals installed in snowy areas and high-altitude areas.

Further, both an incandescent traffic signal and an LED traffic signal generally have an eave attached thereto. When snow accumulates, a problem arises that a snow buildup on or an icicle hanging down from the eave weights the signal no matter whether the signal is of a vertical type or of a horizontal type, which places a heavy load on a signal pole to be a cause of a failure.

Therefore, both for the purpose of ensuring the visibility of traffic signals and for the purpose of maintaining bodies of the signals, man power has been used to remove snow, icicles, and the like attached to traffic signals installed in snowy areas and high-altitude areas, but this work requires enormous efforts under severe circumstances.

Therefore, for example, a snow buildup removing hood device is proposed in which a protruding portion is attached above an eave of a traffic signal, and a circular tubular hood including a ring-like frame portion having a plumb attached thereto is fit onto the eave to separate and slide down a snow buildup to be removed (Japanese Utility Model Registration No. 3072584). However, such a device is heavy and large to some extent.

Therefore, the inventors of the present invention diligently made a study of development of an LED signal which was able to inhibit more effectively snow accretion, ice accretion, frost accretion, freeze of snow, freeze of ice, freeze of frost, and the like and which was able to obtain satisfactory visibility. The result was that the inventors of the present invention developed an LED traffic signal in which a heat generating plate is placed in proximity to an air vent in a printed board protection cover (Japanese Utility Model Registration No. 3163928).

This LED traffic signal exhibited the effect of inhibiting snow accretion, ice accretion, frost accretion, freeze of snow, freeze of ice, freeze of frost, and the like to some extent, but the snow melting speed was not so high and far infrared radiation was not emitted substantially uniformly over substantially the entire surface of the LED signal light. Thus, the LED traffic signal was not necessarily satisfactory.

SUMMARY OF THE INVENTION

The present invention is made to solve the above-mentioned conventional problem, and an object of the present invention is to provide a snow-melting LED traffic signal which can inhibit snow accretion, ice accretion, frost accretion, freeze of snow, freeze of ice, freeze of frost, and the like promptly without fail and can obtain satisfactory visibility.

Specifically, according to a first aspect of the present invention, there is provided a snow-melting LED traffic signal, including:
 an LED signal light including in order:
  a lens cover;
  a heat generating sheet;
  an LED mask plate;
  an LED lens module; and
  a printed board protection cover; and
 a signal body for housing the LED signal light.

According to a second aspect of the present invention, there is provided a snow-melting LED traffic signal according to the first aspect, in which the heat generating sheet is a planar far infrared heat generating sheet laminated with a lamination film.

According to a third aspect of the present invention, there is provided a snow-melting LED traffic signal according to the second aspect, in which the planar far infrared heat generating sheet is a heating element that is formed by impregnating cloth with a nanocarbon paint and is laminated with an insulating sheet.

According to a fourth aspect of the present invention, there is provided a snow-melting LED traffic signal according to the second or third aspect, in which the planar far infrared heat generating sheet generates heat by being energized by an alternating-current power supply.

According to a fifth aspect of the present invention, there is provided a snow-melting LED traffic signal according to anyone of the first to fourth aspects, further including a thermostat.

According to a sixth aspect of the present invention, there is provided a snow-melting LED traffic signal according to the second or third aspect, in which the planar far infrared heat generating sheet generates heat by being energized by an alternating-current power supply in synchronization with a lit state of a signal light within a temperature range set on a thermostat.

The snow-melting LED traffic signal according to the present invention can inhibit snow accretion, ice accretion, frost accretion, freeze of snow, freeze of ice, freeze of frost, and the like promptly without fail and can obtain satisfactory visibility.

Specifically, according to the present invention, the planar far infrared heat generating sheet generates heat and emits far infrared radiation, and thus the lens cover on the outermost side (front surface) of the LED signal light can be sufficiently heated. Therefore, snow, ice, and frost stuck on and freeze of the lens cover can be removed and released promptly without fail and accretion thereof can be inhibited (prevented) to thereby obtain satisfactory visibility.

Therefore, according to the present invention, the LED traffic signal which can inhibit snow accretion, ice accretion, frost accretion, freeze of snow, freeze of ice, freeze of frost, and the like promptly without fail and can obtain satisfactory visibility can be provided. The present invention can be effectively used in a quest to ensure safety of road traffic and to smooth a traffic flow.

DETAILED DESCRIPTION OF THE PREFERRED EMBODIMENT

The present invention relates to a snow-melting LED traffic signal including:
an LED signal light 1 including in order:
a lens cover 11;
a heat generating sheet 12;
an LED mask plate 13;
an LED lens module 14; and
a printed board protection cover 15; and
a signal body 2 for housing the LED signal light 1.

The present invention is described in detail in the following with reference to the attached drawings.

Figure 1:
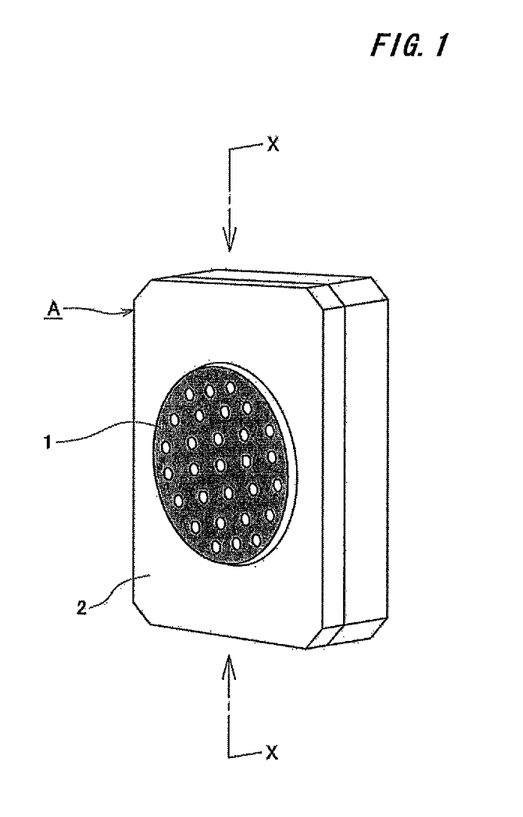
FIG. 1 is a perspective view illustrating a snow-melting LED traffic signal according to an embodiment of the present invention.
Figure 2:
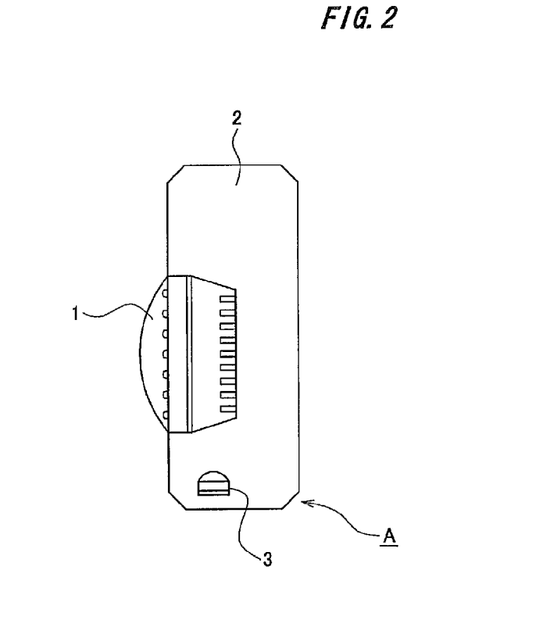
FIG. 2 is a sectional explanatory view taken along the line X-X of FIG. 1.
Figure 3:
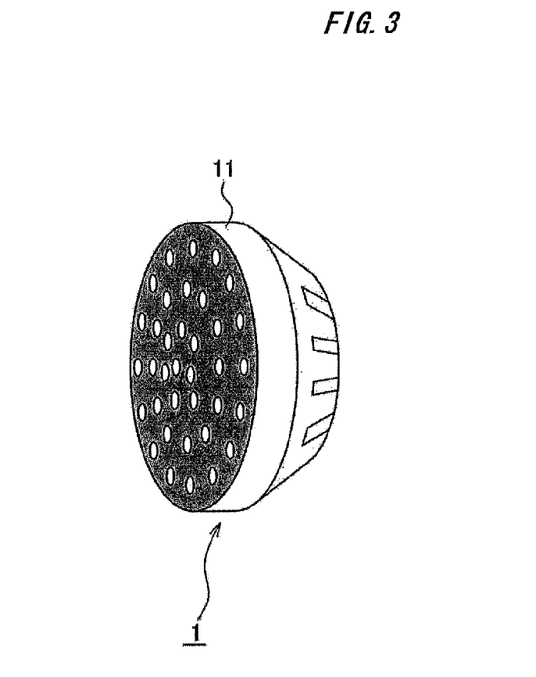
FIG. 3 illustrates an LED signal light 1 according to the embodiment.
Figure 4:
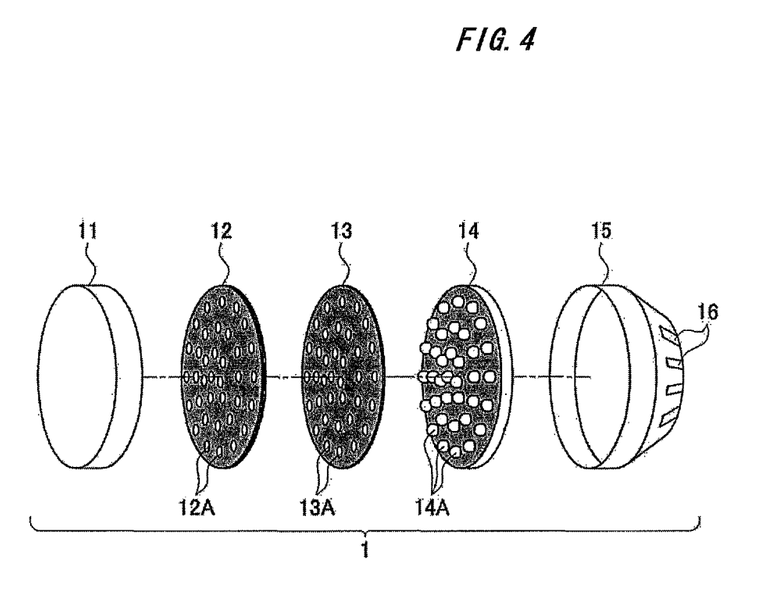
FIG. 4 is an exploded explanatory view of the LED signal light 1 illustrated in FIG. 3.
Figure 5:
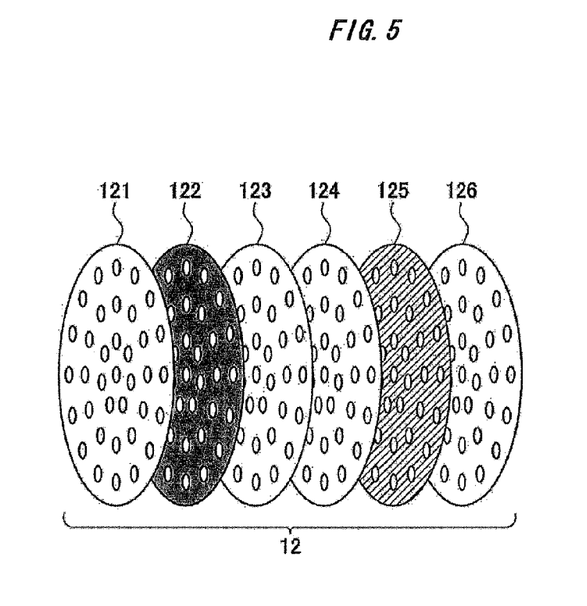
FIG. 5 is an exploded explanatory view of a heat generating sheet 12.

FIG. 1 is a perspective view illustrating a snow-melting LED traffic signal according to an embodiment of the present invention. FIG. 2 is a sectional explanatory view taken along the line X-X of FIG. 1. FIG. 3 illustrates an LED signal light 1 according to the embodiment. FIG. 4 is an exploded explanatory view of the LED signal light 1 illustrated in FIG. 3. FIG. 5 is an exploded explanatory view of a heat generating sheet 12.

In the figures, a reference character A denotes a snow-melting LED traffic signal according to the present invention.

The snow-melting LED traffic signal A according to the present invention basically includes the LED signal light 1 and a signal body 2, and has a feature in the internal structure thereof, that is, the LED signal light 1 housed in the signal body 2.

A traffic signal is a device for indicating a sign of "go", "stop", or the like generally in a quest to ensure safety of road traffic or railroad traffic or to smooth a traffic flow.

The snow-melting LED traffic signal A is not specifically limited insofar as it is a traffic signal such as a signal for road traffic or a signal for railroad traffic. Exemplary signals for road traffic include a traffic signal for vehicles, a traffic signal for pedestrians, a traffic signal for bicycles, and a traffic signal for streetcars.

Further, with regard to the shape of the snow-melting LED traffic signal A, the traffic signal may be of a vertical type or may be of a horizontal type.

Note that, in the figures, illustrated is a snow-melting LED traffic signal including only one LED signal light, but the present invention is not limited thereto. The snow-melting LED traffic signal may include three signal lights of red, yellow, and green, or may include two signal lights of red and green like signal lights for pedestrians.

This embodiment according to the present invention relates to the snow-melting LED traffic signal A of a type in which the LED signal light 1 is housed (incorporated) in the signal body 2.

The LED signal light 1 housed in the signal body 2 of the snow-melting LED traffic signal A according to the present invention includes a lens cover 11, the heat generating sheet 12, an LED mask plate 13, an LED lens module 14, and a printed board protection cover 15 which are placed in sequence.

As is apparent from FIGS. 1, 2, 3, and 4, among the lens cover 11, the heat generating sheet 12, the LED mask plate 13, the LED lens module 14, and the printed board protection cover 15 which form the LED signal light 1, the lens cover 11 on the outermost side (leftmost side in FIG. 4) of the LED signal light 1 protrudes from the signal body 2. At the lens cover 11, snow accretion, ice accretion, frost accretion, freeze of snow, freeze of ice, freeze of frost, and the like may occur.

Therefore, it is important how the lens cover 11 on the outermost side (front surface) of the LED signal light 1 is heated.

The LED lens module 14 which forms a main portion of the LED signal light 1 basically includes a printed board and a plurality of LED lamps placed (mounted) on the printed board.

In the LED lens module 14, the printed board and the plurality of LED lamps placed on the printed board are integrally formed to form one structure.

The plurality of LED lamps are placed on the printed board of the LED lens module 14. In FIG. 4, there are illustrated the plurality of LED lamps placed along with the circumference of the printed board, but the present invention is not limited thereto. The number of the LED lamps may be appropriately selected taking into consideration the size of the LED signal light 1 and the like.

Further, with regard to the color of the LED lamps, for example, when the LED lamps are for a red signal, LED lamps which emit red light are used.

The printed board protection cover 15 is placed behind the rear surface of the LED lens module 14 (in FIG. 4, on the right side of the LED lens module 14) to protect the printed board.

In FIG. 4, air vents 16 are formed in the printed board protection cover 15 for dissipating heat.

Note that, the printed board protection cover 15 is generally made of steel or stainless steel, but, as necessary, may be made of a plastic.

The LED lens module 14 and the printed board protection cover 15 are generally commercially available as an integral LED signal light assembly, and hence such an assembly may also be used.

In the LED signal light 1, the LED mask plate 13, the heat generating sheet 12, and the lens cover 11 are placed in this order on the front surface of the LED lens module 14 (in FIG. 4, from right to left).

Therefore, in FIG. 4, as seen from the lens cover 11 side, the heat generating sheet 12, the LED mask plate 13, the LED lens module 14, and the printed board protection cover 15 are placed in this order on the right side of the lens cover 11 to form the LED signal light 1.

The present invention has the largest feature in that the heat generating sheet 12 is provided between the LED mask plate 13 and the lens cover 11.

In general, the LED mask plate 13 and the heat generating sheet 12 are separately manufactured and a structure in which the heat generating sheet 12 is bonded onto the LED mask plate 13 so as to be integral therewith may be used. However, if possible, a structure in which the LED mask plate 13 and the heat generating sheet 12 are integrally formed may also be used.

Apertures 12A are formed in the heat generating sheet 12 so as not to block light emitted from the plurality of LED lamps in the LED lens module 14, similar to apertures 13A into which the LED lamps placed on the LED lens module 14 are fitted.

The heat generating sheet 12 and the LED mask plate 13 are basically in the same shape.

In the case of a traffic signal using red light, green light, and yellow light, the LED mask plate 13 is generally a black-colored plate-like body made of a resin (such as a polycarbonate resin) having the apertures 13A formed therein. The LED lamps placed on the LED lens module 14 fit into the apertures 13A.

The shape of the LED mask plate 13 is not limited to the one illustrated in FIG. 4, and shapes which are generally used (for example, a human shape in the case of a signal for pedestrians) may be used depending on the purpose.

The LED mask plate 13 functions as a protection of the LED lens module 14 (the printed board and the plurality of LED lamps placed on the printed board included therein), and at the same time, sharpens light emitted by the LED lamps.

As the heat generating sheet 12, a planar far infrared heat generating sheet 122 laminated with a lamination film is used. This lamination protects surfaces of the planar far infrared heat generating sheet 122 against moisture and dirt, and at the same time, the surfaces are glazed.

As the lamination film, generally, a film formed of polypropylene is used, but a film formed of polyvinyl chloride, polyester, or the like may also be used. The thickness of the lamination film is not specifically limited, but typically about 20 to 100 μm.

The method of the lamination is not specifically limited. However, hot lamination is typically used in which heat is applied to a lamination film coated with an adhesive to melt the adhesive while pressure is applied to fix it.

The lamination film needs to be placed so as to cover at least both a front surface and a rear surface of the planar far infrared heat generating sheet 122 in order to protect the surfaces of the planar far infrared heat generating sheet 122.

FIG. 5 illustrates the heat generating sheet 12 in which aluminum foil 125 is further placed on the LED mask plate 13 side.

By placing the aluminum foil 125 on the LED mask plate 13 side in this way, heat and far infrared radiation generated from the planar far infrared heat generating sheet 122 can be effectively emitted to the front side, i.e., the lens cover 11 side, while heat and far infrared radiation generated from the heat generating sheet 12 is rarely emitted to the side of the LED lamps in the LED lens module 14 which are placed on the rear side of the LED mask plate 13.

When the aluminum foil 125 is placed in this way, as illustrated in FIG. 5, it is preferred to form the heat generating sheet 12 as a lamination of six layers in total (a lamination film 121, the planar far infrared heat generating sheet 122, a lamination film 123, a lamination film 124, the aluminum foil 125, and a lamination film 126) in which both the front surface and the rear surface of the planar far infrared heat generating sheet 122 are covered with a lamination film and both a front surface and a rear surface of the aluminum foil 125 are covered with a lamination film. The heat generating sheet 12 as a lamination can be manufactured by bonding the layers together, or, by integral formation.

With the structure of the LED signal light 1 described above, heat and far infrared radiation generated from the planar far infrared heat generating sheet 122 in the heat generating sheet 12 can be effectively emitted toward the front (front surface) side, i.e., the lens cover 11 side.

In particular, when, as described above, the aluminum foil 125 is placed in the heat generating sheet 12, heat and far infrared radiation generated from the planar far infrared heat generating sheet 122 can be effectively emitted to the front (front surface) side, i.e., the lens cover 11 side while being rarely emitted to the side of the LED lamps in the LED lens module 14 which are placed on the rear side of the LED mask plate 13.

As described above, the aluminum foil 125 functions as both a reflector and a heat insulating plate, and causes far infrared radiation emitted from the planar far infrared heat generating sheet 122 to be intensively directed to the front side, i.e., the lens cover 11 side.

Further, when the direction of emitted far infrared radiation is regulated (regulated so as to be emitted to the front side, i.e., the lens cover 11 side) by reflecting with aluminum foil or the like, the effect on the front surface is great, and the effect of preventing visibility interference due to snow accretion, ice accretion, frost accretion, freeze of snow, freeze of ice, freeze of frost, and the like is greater.

Further, by placing the "aluminum foil 125" in the heat generating sheet 12, together with usage of a heating element formed by impregnating cloth with a nanocarbon paint and laminated with an "insulating sheet" as the planar far infrared heat generating sheet 122, the LED lamps and the printed board in the LED lens module 14 can be protected against heat and far infrared radiation.

As the planar far infrared heat generating sheet 122, specifically, a heating element formed by impregnating cloth with a nanocarbon paint and laminated with an insulating sheet (planar heating element) is used. The planar heating element is a thin and soft sheet-like heater having a thickness of about 0.8 mm.

An advantage of the planar far infrared heat generating sheet 122 is that, by uniforming the electrical resistance of the entire sheet, uniform heat generation and far infrared radiation emission over the surface can be obtained instantaneously.

Differently from heating by heat conduction using an electrically heated wire or the like, heating using the planar far infrared heat generating sheet 122 is heating mainly by heat wave propagation by far infrared radiation and the generated heat passes through a substance. Further, the heat generating sheet 12 is, for example, bonded onto the LED mask plate 13 so as to be integral. Therefore, far infrared radiation acts on the entire front surface of the snow-melting LED traffic signal A and is emitted from the entire front surface. Therefore, an eave is not necessarily required, and an eave may be appropriately provided as necessary. When an eave is not required, no snow accumulates on the eave, and thus, the signal light obtains a wider visibility angle.

The planar far infrared heat generating sheet 122 converts electric current from an alternating-current power supply or a direct-current power supply into far infrared radiation and emits the far infrared radiation with the far infrared radiation emissivity of 95% or more, and thus, the power consumption is small. Further, the planar far infrared heat generating sheet 122 is thin and soft, and thus, can be freely bent. The highest surface temperature of the planar far infrared heat generating sheet 122 is 30 to 35° C., and thus, is safe.

Far infrared radiation generated from the planar far infrared heat generating sheet 122 has a wavelength of 6 to 12 µm, and is safe and secure far infrared radiation which does not generate a hazardous electromagnetic wave.

By cutting the planar far infrared heat generating sheet 122 into an appropriate size, providing electrodes at both ends thereof, and connecting the ends to a power supply, far infrared radiation can be generated to heat the lens cover 11 on the front side.

Further, when used, the planar far infrared heat generating sheet 122 is excellent in durability and has low maintenance costs.

The power supply of the planar far infrared heat generating sheet 122 is, similarly to a power supply of the LED signal light 1, generally alternative current (AC) 100 V or 200 V, but, as necessary, direct current (DC) 12 V or 24 V may also be used.

Specifically, the planar far infrared heat generating sheet 122 generates heat and emits far infrared radiation by being energized by an alternating-current power supply in general. Alternatively, the planar far infrared heat generating sheet 122 may generate heat by being energized by, for example, a rechargeable battery (direct-current power supply) which stores electric power obtained through a solar power generation panel as clean energy. The latter case eliminates the need for the maintenance. In any of these cases, the specifications and the installation position of the planar far infrared heat generating sheet 122 are the same.

The LED signal light 1 has the structure described above.

The snow-melting LED traffic signal according to the present invention includes the LED signal light 1 and the signal body 2 for housing therein the LED signal light 1.

The signal body 2 is a housing for housing the LED signal light 1, and is, for example, substantially in the shape of a rounded-corner rectangle when seen from the front, as can be seen from FIG. 1. As a matter of course, the present invention is not limited thereto, and the signal body 2 may have different shapes depending on the kind of the LED traffic signal and the like.

Note that, the signal body 2 is generally made of aluminum or stainless steel.

The snow-melting LED traffic signal according to the present invention is adapted to be energized in synchronization with a lit state of a signal light within a temperature range set on a thermostat.

Note that, according to the present invention, a sensor for sensing snow accretion, ice accretion, or frost accretion may be provided, and a bimetallic thermostat 3 is generally used. A bimetallic thermostat acts as both a temperature sensor and an automatic temperature control.

By using a bimetallic thermostat, the range in which the planar far infrared heat generating sheet 122 in the heat generating sheet 12 operates is set.

For example, the bimetallic thermostat 3 is used to set so that, when the atmospheric temperature drops to 5° C. or lower, the power supply is turned on and heat is generated, and, when the atmospheric temperature is 10° C., the power supply is turned off. In this case, the planar far infrared heat generating sheet 122 is not energized until the atmospheric temperature drops to 5° C. or lower, thereby saving energy. As illustrated in FIG. 2, the thermostat 3 is mounted in the inside of the signal body 2.

When the LED traffic signal A according to the present invention is installed in, for example, snowy areas or high-altitude areas, if the atmospheric temperature drops to, for example, 5° C. or lower, the bimetallic thermostat 3 works to turn on the power supply. Then, the planar far infrared heat generating sheet 122 generates heat and emits far infrared radiation to heat the LED signal light 1, in particular, the lens cover 11 on the front side thereof. In this way, snow, icicle, and the like which attaches to or hangs down from the lens cover 11 can be removed. As a result, stuck snow, stuck ice, and frost can be removed, accretion thereof can be inhibited (prevented), and satisfactory visibility of the traffic signals can be obtained.

When the atmospheric temperature rises to, for example, 10° C., the bimetallic thermostat 3 works to turn off the power supply.

The above-mentioned LED traffic signal A according to the present invention was placed for an hour under a state in which the atmospheric temperature was −10° C. and snow fell. The bimetallic thermostat 3 worked to turn on the power supply, and the planar far infrared heat generating sheet 122 was caused to generate heat and emit far infrared radiation. The snow melting speed, the energization time period, the power consumption, and the effect on the printed board were evaluated. Further, the temperature distribution of the LED signal light 1 was measured using thermography. The result is shown in Table 1 and FIG. 6.

Note that, for comparison purposes, with regard to the LED signal disclosed in Japanese Utility Model Registration No. 3163928, similarly, the planar far infrared heat generating sheet was caused to generate heat and emit far infrared radiation. The snow melting speed, the energization time period, the power consumption, and the effect on the printed board were evaluated. Further, the temperature distribution of the LED signal light assembly 1 was measured using thermography. The result is shown in Table 1 and FIG. 7.

TABLE 1

|  | The present Invention | Comparative Example (Japanese Utility Model Registration No. 3163928) |
|---|---|---|
| Snow melting speed | The temperature of the lens cover portion on the surface of the LED signal light turned positive in about 40 seconds to 60 seconds. No snow accumulation was observed on the lens cover portion. | The temperature of the entire signal turned positive in about 3 to 4 minutes. Snow disappeared from the entire signal. |

TABLE 1-continued

Figure 6:
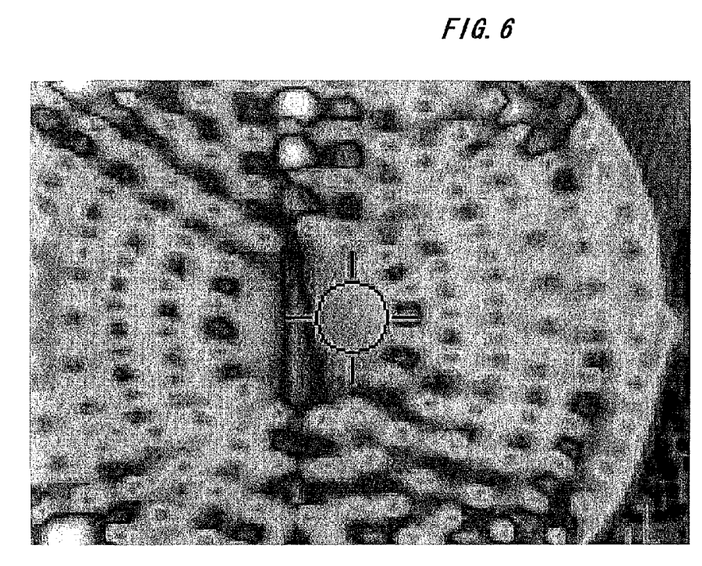
FIG. 6 is a photographic image showing the result of measurement of temperature distribution in the LED signal light 1 using thermography with regard to an LED traffic signal A according to the present invention.
Figure 7:
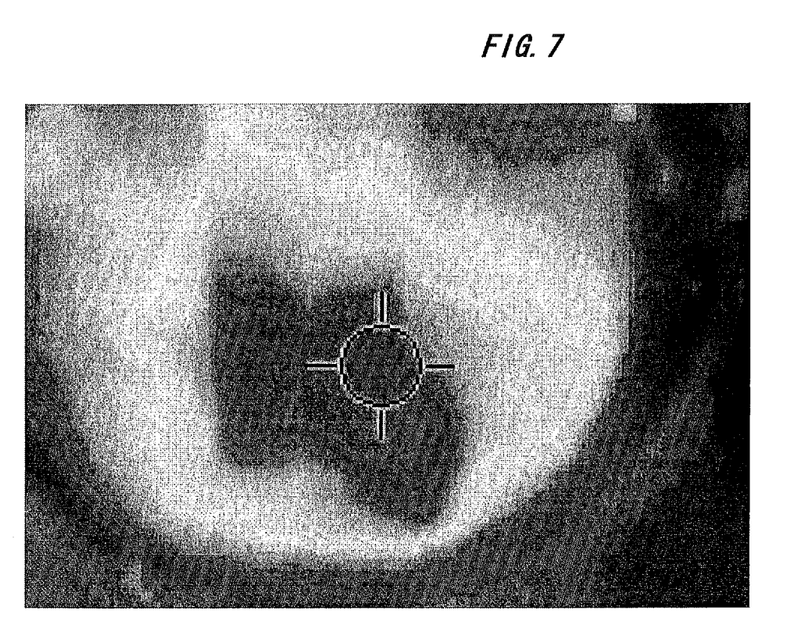
FIG. 7 is a photographic image showing the result of measurement of temperature distribution in the LED signal light 1 using thermography with regard to an LED signal according to Japanese Utility Model Registration No. 3163928.

| | The present Invention | Comparative Example (Japanese Utility Model Registration No. 3163928) |
|---|---|---|
| Energization time period | The lens cover portion on the surface of the LED signal light and the heating element were in proximity to each other, and thus, the energization time period was able to be short end. | The heating element was placed at the back, and thus, the energization time period was longer than that according to the present invention. |
| Power consumption | 13 W | 15 W |
| Effect on printed board | Far infrared radiation was able to be effectively emitted toward the lens cover portion, and thus, the printed board at the back was hardly affected. | Far infrared radiation was emitted from the back side of the printed board, and thus, there is a possibility of some adverse effect on the printed board. |
| Temperature distribution | FIG. 6 It can be seen that the temperature distribution was fairly uniform over the entire surface of the lens cover portion. | FIG. 7 The lens cover portion exhibited nonuniform temperature distribution. |

From Table 1 and FIGS. 6 and 7, compared to the LED signal disclosed in Japanese Utility Model Registration No. 3163928 as the comparative example, the LED traffic signal A according to the present invention emitted far infrared radiation substantially uniformly over substantially the entire surface of the LED signal light 1.

Therefore, the LED traffic signal according to the present invention is expected to be able to inhibit snow accretion, ice accretion, frost accretion, freeze of snow, freeze of ice, freeze of frost, and the like promptly without fail.

Therefore, according to the present invention, the LED traffic signal which can inhibit snow accretion, ice accretion, frost accretion, freeze of snow, freeze of ice, freeze of frost, and the like promptly without fail and can obtain satisfactory visibility can be provided, and the present invention can be effectively used in a quest to ensure safety of road traffic and to smooth a traffic flow.

What is claimed is:

1. A snow-melting LED traffic signal, comprising:
an LED signal light, comprising in order:
a lens cover;
a heat generating sheet;
an LED mask plate;
an LED lens module; and
a printed board protection cover; and
a signal body for housing the LED signal light,
wherein the heat generating sheet has apertures formed therein into which LED lamps placed on the LED lens module are fitted, the LED mask plate has apertures formed therein into which LED lamps placed on the LED lens module are fitted, and the heat generating sheet is bonded onto the LED mask plate so as to be integral therewith, thereby masking the LED lens module.

2. The snow-melting LED traffic signal according to claim 1, wherein the heat generating sheet comprises a planar far infrared heat generating sheet laminated with a lamination film.

3. The snow-melting LED traffic signal according to claim 2, wherein the planar far infrared heat generating sheet comprises a heating element that is formed by impregnating cloth with a nanocarbon paint and is laminated with an insulating sheet.

4. The snow-melting LED traffic signal according to claim 2, wherein the planar far infrared heat generating sheet generates heat by being energized by an alternating-current power supply.

5. The snow-melting LED traffic signal according to claim 1, further comprising a thermostat.

6. The snow-melting LED traffic signal according to claim 2, wherein the planar far infrared heat generating sheet generates heat by being energized by an alternating-current power supply in synchronization with a lit state of a signal light within a temperature range set on a thermostat.

7. The snow-melting LED traffic signal according to claim 3, wherein the planar far infrared heat generating sheet generates heat by being energized by an alternating-current power supply.

8. The snow-melting LED traffic signal according to claim 2, further comprising a thermostat.

9. The snow-melting LED traffic signal according to claim 3, further comprising a thermostat.

10. The snow-melting LED traffic signal according to claim 4, further comprising a thermostat.

11. The snow-melting LED traffic signal according to claim 6, further comprising a thermostat.

12. The snow-melting LED traffic signal according to claim 7, further comprising a thermostat.

13. The snow-melting LED traffic signal according to claim 3, wherein the planar far infrared heat generating sheet generates heat by being energized by an alternating-current power supply in synchronization with a lit state of a signal light within a temperature range set on a thermostat.

* * * * *